United States Patent [19]
Olson et al.

[11] Patent Number: 5,394,460
[45] Date of Patent: * Feb. 28, 1995

[54] VOICE PROCESSING SYSTEMS CONNECTED IN A CLUSTER

[75] Inventors: Peter D. Olson, Los Gatos; Burton N. Kendall, Saratoga, both of Calif.

[73] Assignee: Octel Communications Corporation, Milpitas, Calif.

[*] Notice: The portion of the term of this patent subsequent to Apr. 5, 2011 has been disclaimed.

[21] Appl. No.: 183,122

[22] Filed: Jan. 18, 1994

Related U.S. Application Data

[63] Continuation of Ser. No. 831,464, Feb. 5, 1992, Pat. No. 5,301,226.

[51] Int. Cl.[6] .................................................. H04M 3/50
[52] U.S. Cl. ..................................... 379/67; 379/89; 379/212; 379/232
[58] Field of Search .................. 379/89, 88, 67, 84, 379/231, 232, 233, 210, 212, 213, 214, 201

[56] References Cited

U.S. PATENT DOCUMENTS

| | | | |
|---|---|---|---|
| 4,612,416 | 9/1986 | Emerson et al. | 379/88 |
| 4,972,461 | 11/1990 | Brown et al. | 379/67 |
| 5,029,199 | 7/1991 | Jones et al. | 379/89 |
| 5,113,430 | 5/1992 | Richardson, Jr. et al. | 379/88 |
| 5,163,080 | 11/1992 | Amoroso et al. | 379/33 |
| 5,179,585 | 1/1993 | MacMillans, Jr. et al. | 379/88 |

Primary Examiner—Thomas W. Brown
Attorney, Agent, or Firm—Elmer Galbi

[57] ABSTRACT

The present invention provides a highly reliable network of interconnected voice processing modules. The voice processing modules are interconnected by a high speed FDDI network so that information can be transferred between the modules at high speed. All of the incoming lines for all the interconnected modules are connected in a single hunt group. Each user's profile is stored in two modules and each module includes a directory that shows were each user's profile is stored. When a call arrives at a particular module, the directory is first checked to insure that the desired user does have a mailbox somewhere on the network and to determine where the particular user's profile is located. The user's profile is obtained via the FDDI network from one of the modules where it is located. The profile will show where the associated greeting is stored. The greeting is obtained via the FDDI bus (if it is not on the system which received the call) and the greeting is played. If the caller leaves a message, it is stored on the system which received the call. The user's profile is updated to show that a message was stored and to show where the message is stored. The updated user's profile is then returned to the two systems where it was originally stored.

9 Claims, 12 Drawing Sheets

FIGURE 2A AMT TABLE

| MAILBOX NUMBER | LOCATION OF MAIN PROFILE | LOCATION OF BACKUP PROFILE |
|---|---|---|
| (ADDITIONAL RECORDS) | | |

FIGURE 2B USER PROFILE TABLE

| MAILBOX NUMBER | LOCATION OF GREETING | ARE MESSAGES STORED | LOCATION OF MESSAGES | CLASS OF SERVICE | PASS WORD |
|---|---|---|---|---|---|
| (ADDITIONAL RECORDS) | | | | | |

VOICE PROCESSING SYSTEMS CONNECTED IN A CLUSTER

The present application is a continuation of application Ser. No. 07/831,464, filed Feb. 5, 1992, which is now issued as U.S. Pat. No. 5,301,226.

FIELD OF THE INVENTION

The present invention relates to voice processing systems and more particularly to the interconnection of voice processing systems.

BACKGROUND OF THE INVENTION

Voice processing systems, sometimes called voice mail systems, are in widespread use. Many of the early voice processing systems were small, relatively simple systems designed for a limited number of users and having a limited number of functions. The technology has advanced to the point where today large voice processing systems which can served thousands of user are available from a variety of vendors. The large voice processing systems that are available today provide a rich menu of functions and they can service many thousands of users.

As systems have grown in size and complexity, two needs have become evident, namely, very high reliability and modularity. Very high reliability is needed so that users can come to depend upon voice processing systems without fear that information will be lost. Modularity is needed so that a module which serves a relatively small number of users can be installed and then as the number of users grows, additional modules can be easily installed, increasing the capacity of the system without the need to discard what has already been installed. Designing systems which satisfy both of these requirements presents significant challenges.

The prior art includes voice processing systems that increase reliability by providing redundant hardware. However, in the prior art systems, each user is assigned to a particular module or sub-system. The module or sub-system to which each user is assigned is generally termed the user's "home" system. Backup is sometimes provided by having each user assigned both to a home module or sub-system and to a backup module or sub-system. The backup module or sub-system only becomes operable if the primary hardware experiences a problem. For example, Digital Equipment Corporation markets a system called DECVoice which can accommodate redundant backup hardware. The cost of providing reliability by merely providing redundant backup hardware is relatively high since such hardware is only used when the primary hardware experiences a problem.

The present invention provides redundancy in a manner that utilizes the backup hardware for normal operations until one of the modules in the system has a problem. When a module has a problem, the work previously done by that module is shifted to the other modules in the system. The typical user would in most instances not even recognize that there was a problem. Stated differently, with the present invention the system includes a number of modules which share the work load. If one of the modules experiences a problem the workload is merely shared by the other modules in the system.

The second requirement discussed above, that is the need to allow for modular growth is also recognized in the prior art. An example of a system which includes a plurality of interconnected voice processing modules is shown in U.S. Pat. No. 5,029,199 (Jones) issued Jul. 2, 1991. U.S. Pat. No. 5,029,199 describes a system which has a distributed architecture including a plurality of message processing modules. The system shown in U.S. Pat. No. 5,029,199 includes a master control unit that directs each incoming call to a particular one of the voice processing modules depending upon a variety of factors. The voice processing modules are interconnected by a local bus. Each subscriber is assigned to a home system; however, messages can be stored remotely and the home processing system can access the remotely stored messages over the local network. The master control unit stores subscriber related information including the identification of the home unit for each subscriber. A key aspect of the system shown in this reference is the fact that the incoming lines are switched between the various voice processing modules by the master control unit.

The present invention provides a modular system without utilizing a master control unit to direct incoming calls. With the present invention the incoming lines are connected as a single hunt group and any module in the system can handle any incoming call.

SUMMARY OF THE PRESENT INVENTION

The present invention provides a highly reliable network of interconnected voice processing modules. With the present invention increased capacity can be achieved by the addition of modules. The voice processing modules are interconnected by a high speed FDDI network so that information can be transferred between the modules at high speed. All of the incoming lines for all the interconnected modules are connected in a single hunt group. Each user's profile is stored in two modules and each module includes a directory that shows were each user's profile is stored. When a call arrives at a particular module, the directory is first checked to insure that the desired user does have a mailbox somewhere on the network and to determine where the particular user's profile is located. The user's profile is obtained via the FDDI network from one of the modules where it is located. The profile will show where the associated greeting is stored. The greeting is obtained via the FDDI network (if it is not on the system which received the call) and the greeting is played. If the caller leaves a message, it is stored on the system which received the call. The user's profile is updated to show that a message was stored and to show where the message is stored. The updated user's profile is then returned to the two systems where it was originally stored.

The present invention provides a highly reliable system since each user's profile is stored on two modules. One of the modules which stores the user's profile can go down and callers will generally not even notice a problem. The present invention also provides a system which does not require the use of a front end master control unit which directs calls to the various modules.

DESCRIPTION OF A PREFERRED EMBODIMENTS

Figure 1:
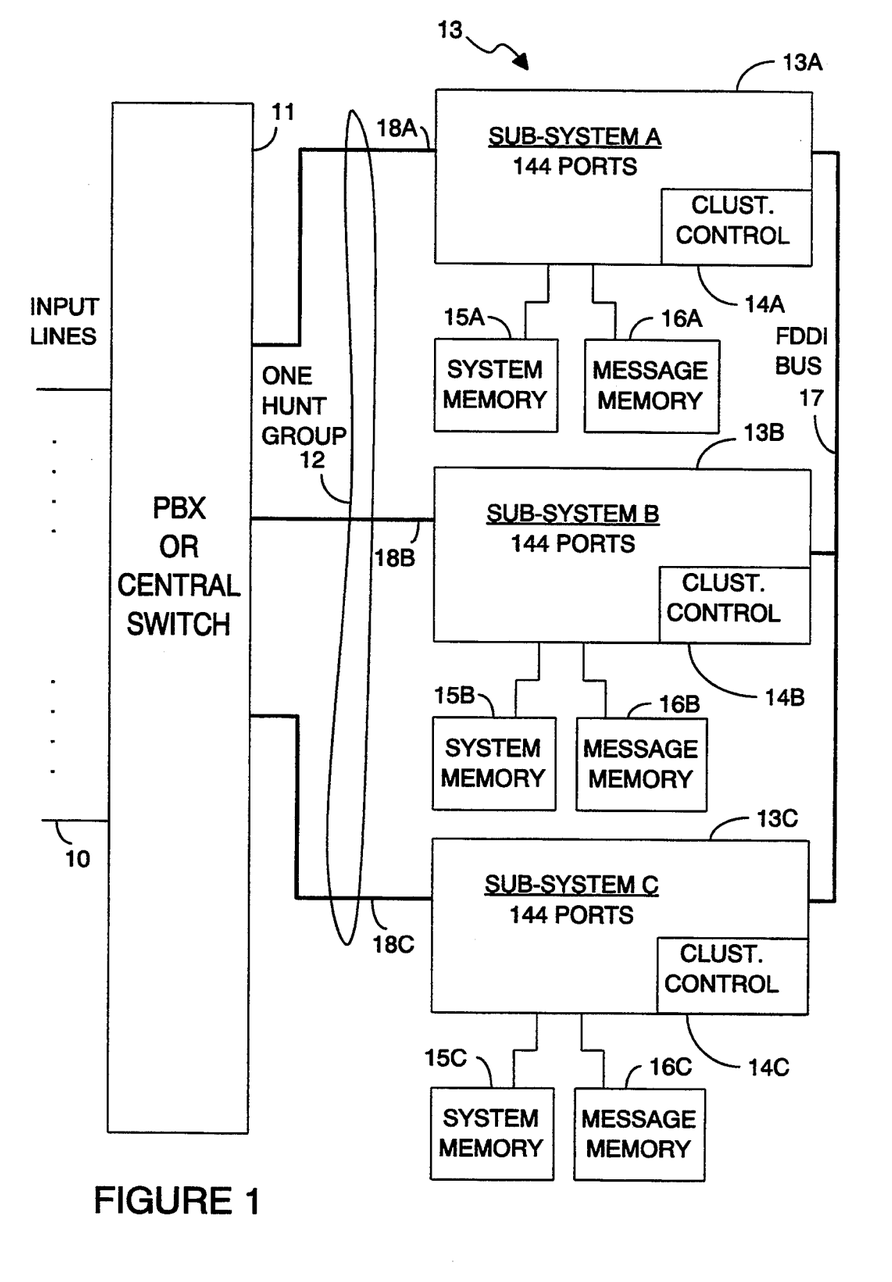
FIG. 1 is an overall diagram of an embodiment of the Invention

An overall system which embodies the present invention is shown in FIG. 1. The system includes a line switch 11, a plurality of voice processing modules or sub-systems 13 and an FDDI Bus 17.

For purposes of illustration the overall system is herein shown as including only three voice processing modules or sub-systems 13A to 13C; however, it should be understood that the invention is applicable to a system having either a large or a small number of modules 13. Each of the voice processing modules 13 is a complete voice processing system with 144 input ports. Each voice processing module 13 can answer a call, play a greeting, record a message and play back messages on demand. Each of the modules 13 has an associated system memory disc drive 15 and an associated message memory disk drive 16. These memory devices and the manner they are connected are conventional. Each of the modules 13 also includes a cluster controller 14 which will be explained in detail later. The cluster controllers 14A, 14B and 14C communicate with each other via FDDI bus 17.

Calls to the system come from input lines 10 that are connected to line switch 11. Line switch 11 is conventional and it is not part of the voice processing system. It merely provides the input lines for the voice processing system. Switch 11 may be either a PBX or a Central Office Switch. The switch 11 directs calls to the trunk lines 12 which are connected as a single hunt group. The fact that trunk lines 12 are connected as a single conventional hunt group is important in that, contrary to the prior art, the incoming calls are arbitrarily directed to one of the nodules 13A to 13C. There is no need for a master control unit which directs calls to particular modules.

It should be understood that while a single central switch or PBX 11 is shown herein, the input lines 18A, 18B and 18C could alternatively come from a plurality of such switches each of which has a single hunt group providing inputs to modules 13A, 13B and 13C. The important point is that there is no need for a front end call director that selectively directs certain calls to certain modules.

Figure 2:
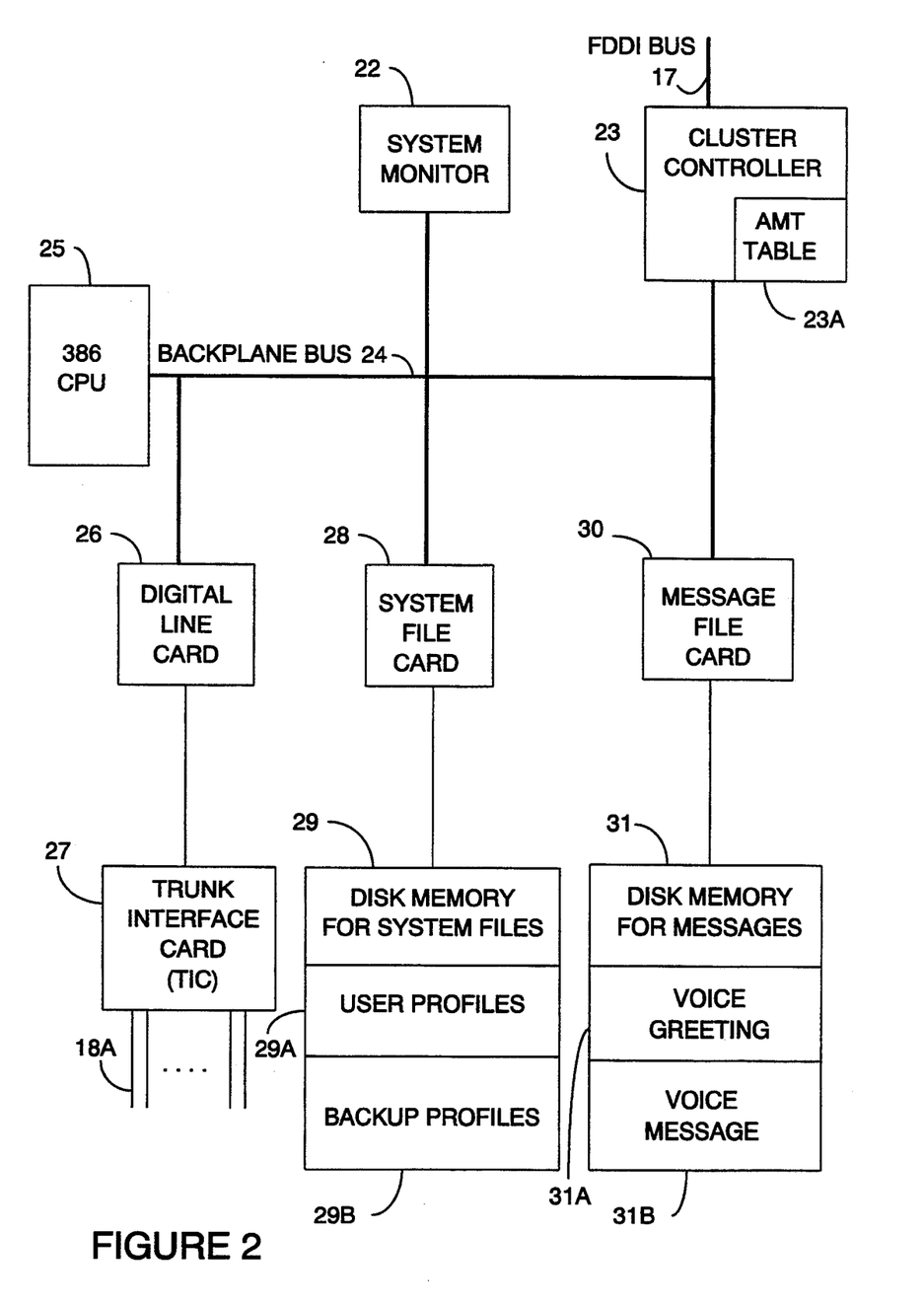
FIG. 2 is a block diagram showing one of the modules shown in FIG. 1.

FIG. 2 is a block diagram of module 13A. It should be understood that modules 13A–13C are identical, hence, FIG. 2 could also apply to modules 13B and 13C. Module 13A includes a CPU 25, which for example, may be an INTEL 86C386. Module 13A also includes, a sub system monitor 22, a cluster controller 23, a digital line card 26, a trunk Interface Cards 27, a system file control card 28, a disk drive memory 29, a message file control card 308, and a disk drive memory 30. The cluster controller 23 is also connected to FDDI bus 17. The disk drive 29 holds system files including user profiles 29A and 29B. The disk drive 31 stores voice messages 31A and 31B.

The units 22, 23, 26, 27 and 30 are interconnected by a backplane connection bus 24 which is connected to CPU 25. That is, bus 24 connects units 22, 23, 26, 27 and 30 to the data bus to the CPU 25. Input calls arrive at module 13 via input lines 18A. These calls go through a trunk Interface Card (TIC) 27 to a digital line card 26 which digitizes the call and makes the data available on bus 24. The trunk interface cards 27 and the digital line card 26 are conventional. System file card 28 provides the CPU 25 with access to the disk memory 29 that contains the user profiles. Likewise message file card 30 provides the system with access to the disk drive 31 that stores voice messages including the greetings 31A and the voice messages 31B which are left by callers.

The cluster controller 23 allows CPU 25 to communicate with the other modules in the system via FDDI bus 17. The cluster controller 23 includes a DRAM memory 23A which stores an AMT table. The AMT table lists all mailboxes on the system.

Figure 2A:
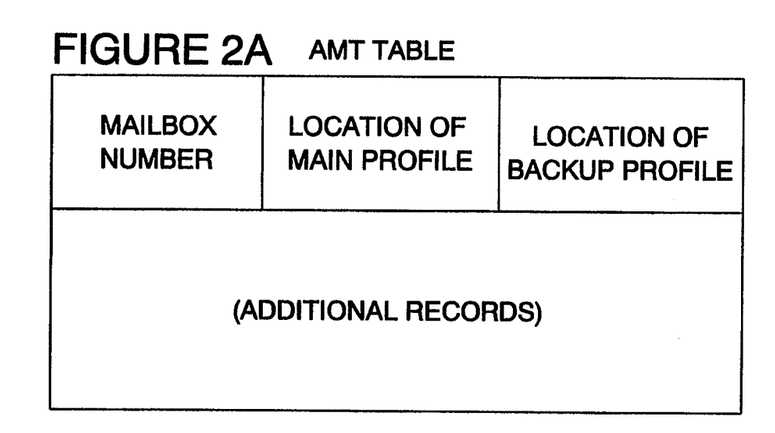
FIG. 2A shows some of the information in the AMT table.

The information stored in the AMT table in cluster controller 23 is shown in FIG. 2A. The AMT table lists each user, that is, each user who has a mailbox on any one of the modules 13A, 13B or 13C. The AMT table gives the location, that is, it identifies the module, where each users profile is located. There is a backup copy of each user's profile which is stored on a different system than the system on which the first copy of the profile is stored. The AMT table lists the location of both copies of each user profile. It is noted that the AMT table on each of the modules 13A, 13B and 13C is identical. Each AMT table lists all the mailboxes, that is, all the users, on the entire cluster. An alternative technique for handling the AMT table is described later.

Figure 2B:
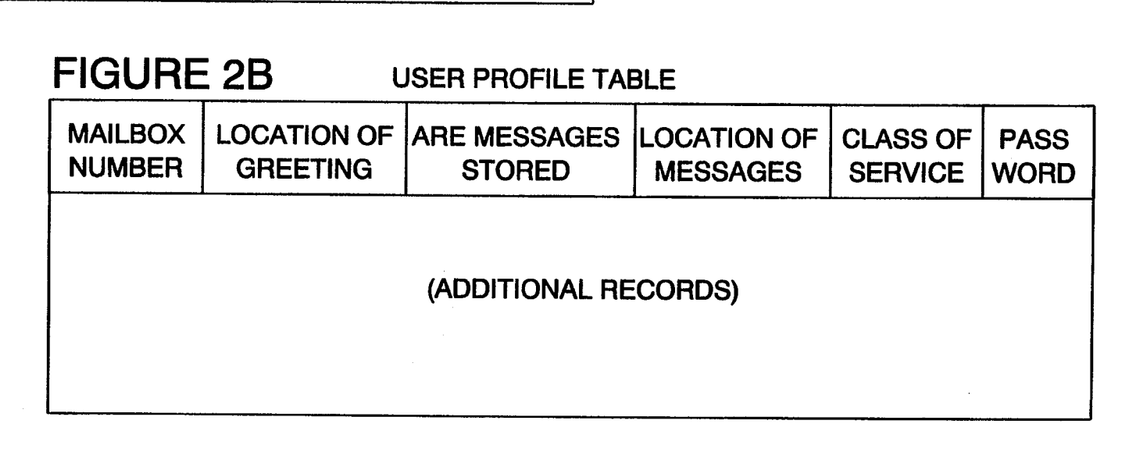
FIG. 2B shows some of the information in a user profile.

Some of the information that is in each user profile is shown in FIG. 2B. A user profile can contain a variety of different kinds of information of the type that is normally stored in user profiles in voice processing system. However, the information in the user profile that is relevant to the present invention is the location of the user's greeting, an indication of whether the user has any pending messages, and the location of the pending messages. FIG. 2B also shows that a user profile may contain other information such as an indication of the class of service assigned to a user and a user pass word. These additional fields in the user profile are conventional and they are not particularly relevant to the present invention. They are shown merely to give an indication that a user profile may also contain the types of information that is conventional in user profiles in voice processing systems.

Calls are answered by voice processing module 13A under control of CPU 25 in a conventional manner, except that, the manner that user profiles, voice greetings and voice messages are stored, referenced and obtained is modified as will be explained in detail. Stated differently, the present invention involves (a) the fact that incoming calls can come into any module in the system (b) the manner and location where user profiles are stored, (c) the manner in which the system obtains the user profiles and the voice greeting (d) the manner in which the system stores and references messages which are left in mailboxes, and (e) the overall organization or architecture of the applicant's system.

Figure 3:
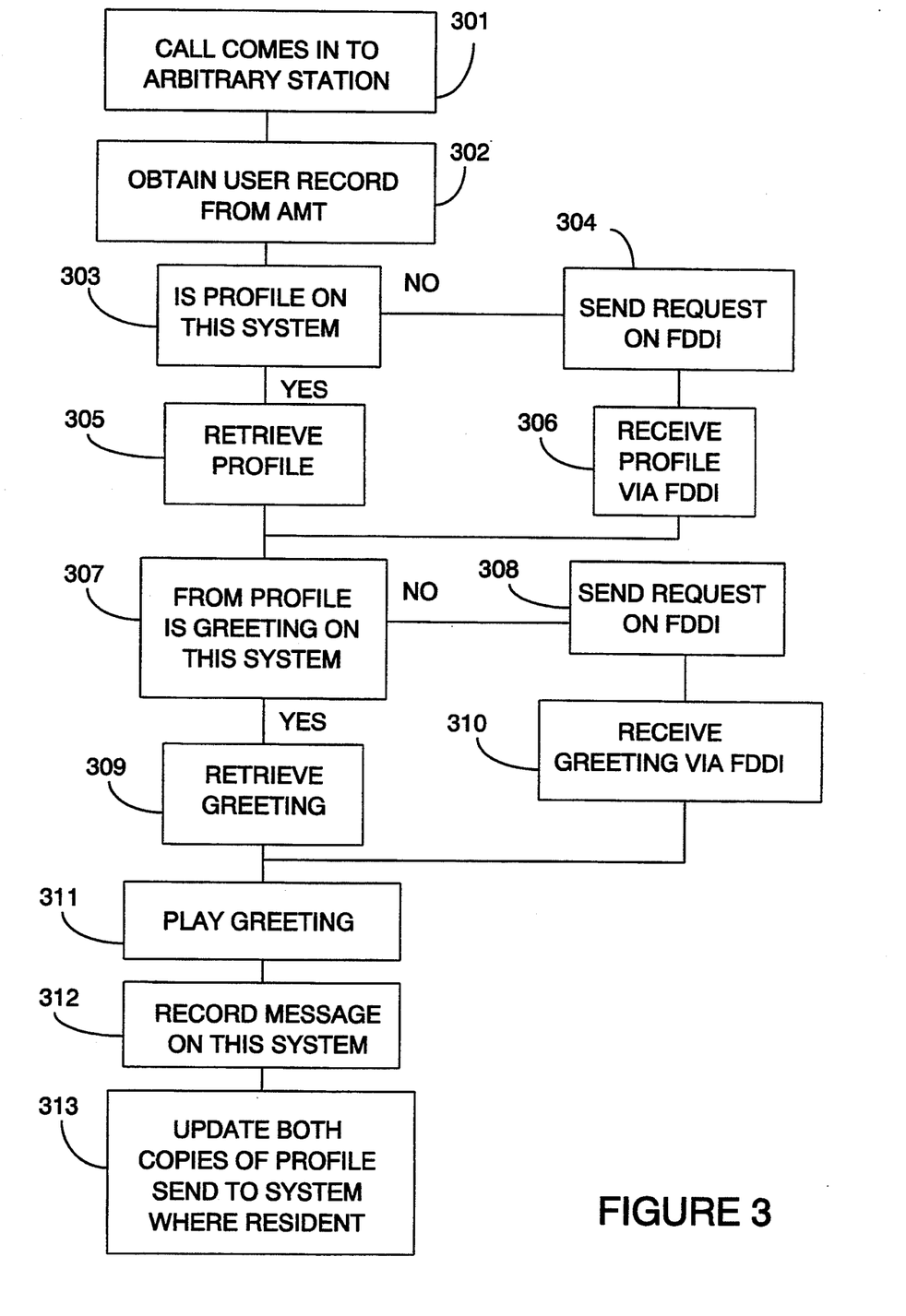
FIG. 3 is a block diagram that shows the sequence of operations that occurs when a call is answered.

FIG. 3 shows the series of actions that occur when a call comes into one of the sub-systems or modules 13. The process begins when a call comes into the system as indicated by block 301. First, as shown by block 302, cluster controller 23 interrogates the AMT table to determine if the called user in fact has a mailbox on any one of modules in the cluster.

As indicated in FIG. 2A, the AMT table will also indicate where the profile of the called user is located. If the profile is not on the module that received the call, cluster controller 23 sends a request to the module where the profile resides, requesting that the profile be sent to the module that received the call. This is illustrated by blocks 304 and 306 in FIG. 3. The user profile also indicates where the greeting of the called user is stored. As indicated by blocks 308 and 310, if the greeting is not on the system that received the call, the cluster controller 23, requests the greeting from the module where it is stored. The greeting is played as indicated by block 311 and any message is recorded. If a message is left, it is recorded in the message storage memory of the system that received the call. As indicated by block 313, the user profile is updated indicating that a message has been left and indicating where the message is stored.

Each user profile is stored in two places in the cluster. The two locations where each profile is stored is indicated in the AMT table as shown in FIG. 2A. When a profile is updated, both copies of the profile are sequentially updated. If the AMT table indicates that one or both copies of a particular profile are stored on systems other than the system that received the call, the profiles are sent to the systems listed in the AMT table via the FDDI bus.

Figure 4:
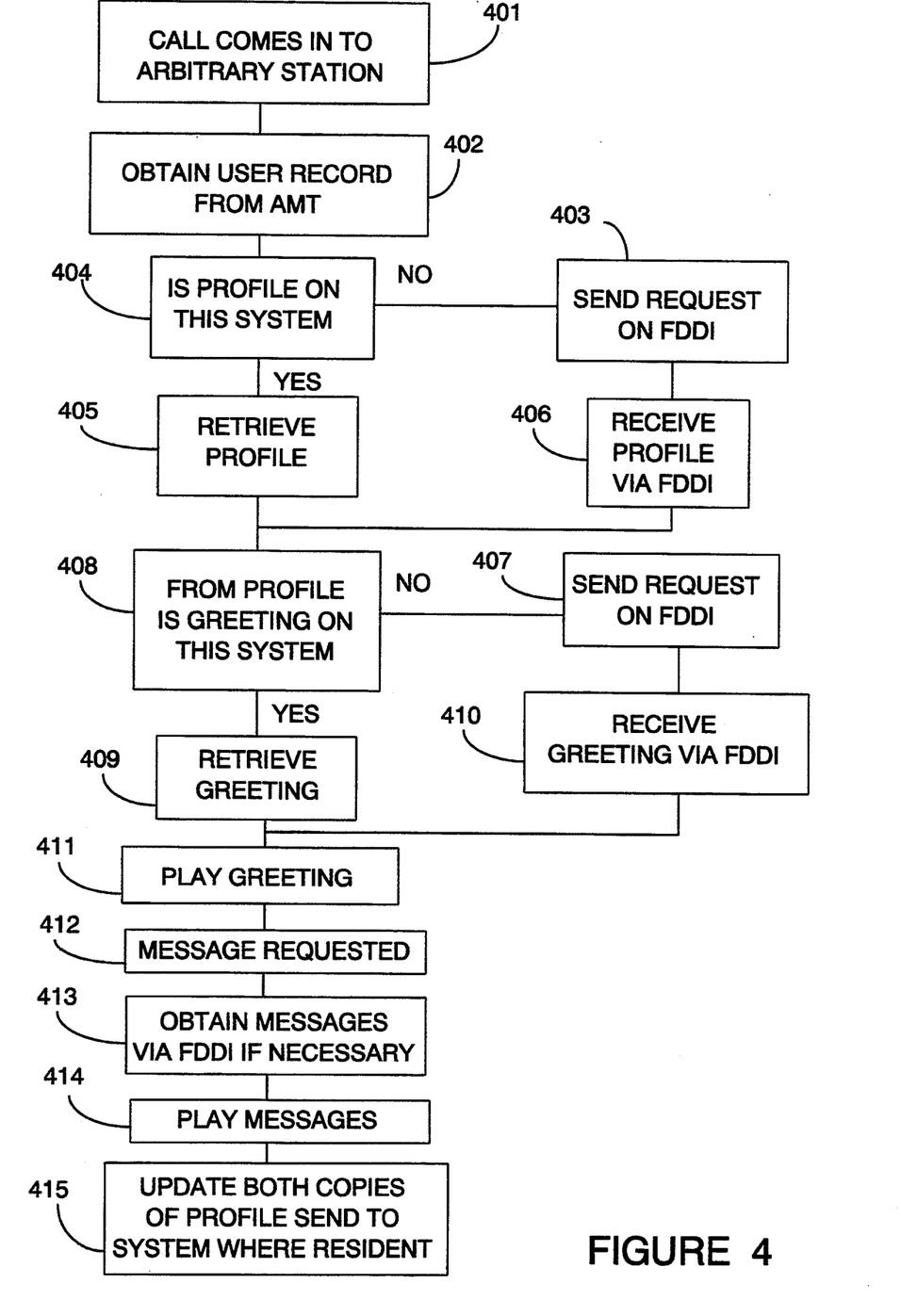
FIG. 4 is a block diagram that shows the sequence of operations that occurs when a message is retrieved.

The operations that occur when a user calls the system to retrieve messages that were left are shown in FIG. 4. First, as indicated by block 401, the call may come in to any one of the modules in the system. When the call comes in, as indicated by block 402 the cluster controller interrogates the AMT table to determine if the particular user does in fact have a mailbox on one of the modules in the system. The location of the user's profile is also determined from the AMT table entry. As indicated by block 405, if the profile is located on the system which received the call, the profile is accessed directly. If the profile is located on a different system, a request is sent to the appropriate system and the profile is retrieved via the FDDI bus as indicated by blocks 403 and 406.

As indicated by block 406, once the profile has been accessed, the location of the user's greeting is determined from the profile. If the greeting is stored on the system which received the call the greeting is directly accessed as indicated by block 409, otherwise a request is sent via the FDDI bus to the system where the greeting is stored and the greeting is retrieved via the FDDI bus as indicated by blocks 407 and 410.

Once the greeting is received, it is played. If the caller requests his messages as indicated by block 412, the caller is asked to enter his password, the password which the caller enters is checked against the password in the user's profile in a conventional manner and if they match, the profile is interrogated to determine if the user has any messages and if so where the messages are located. If necessary the messages are obtained via the FDDI bus as indicated by block 413 and the messages are played as indicated by block 414.

Finally, as indicated by block 415, both copies of the profile are updated and if the profiles are not on the system which received the call the profiles are sent via the FDDI bus to the systems where they are resident as indicated by the AMT table.

In summary, a call can come in to anyone of the modules or sub-systems in the cluster. When a call comes in, the AMT table in the cluster controller is interrogated to determine if the called number has a mailbox anywhere in the cluster of systems and, if the number does have a mailbox, to determine where (i.e. on which system) the profile is located. If necessary the profile is retrieved via the FDDI bus and the location of the greeting is determined. The greeting is then obtained via the FDDI bus if necessary.

Any messages which are left are stored on the system that received the call. The profile is finally updated and sent to the systems indicated in the AMT table. There are two copies of each profile which are stored on different systems so that if there is a failure, both copies will not be lost. The two copies of the profile are updated sequentially, so that if a problem develops during the update operation all of the data will not be lost.

The following is an example of a program written in pseudo code which CPU 25 in sub-system 13A would execute to handle leaving a message on the system and the program which would be executed when a user listens to a message:

Leaving a Message: (that is, answering a call)
Step 1: Detect Ring from Central Switch 11
Step 2: Obtain Mailbox number from Switch 11
Step 3: Read AMT and obtain location of the user record (hereinafter u.r.) for the called mailbox (Note, the u.r. is also called the user profile).
Step 4: Retrieve the u.r. (over the FDDI network if necessary)
Step 5: Obtain location of the greeting from the u.r.
Step 6: Play the greeting (over the FDDI network if necessary, that is, if the greeting is not stored on the system that received the call)
Step 7: Record the message locally (i.e. on the system that received the call.
Step 8: Record the message location in the u.r.
Step 9: Check for other DTMF inputs or hang up.
    <hang up> yes, go to Step 13
    <hang up> no, continue below
Step 10: Prompt for modifier for the message that was left (urgent, private, etc)
Step 11: Receive modifier
Step 12: Set flag in u.r.
Step 13: Write both copies of u.r. sequentially (at least one of these will be over the FDDI network).
Step 14: After both successfully written, release the u.r. If not both successfully written, notify the system operator that a fault has occurred.
Step 15: Hang up.

Response to a call which seeks to Listen to a Message:
Step 1: Detect ring from switch 11.
Step 2: Get mailbox number from switch 11.
Step 3: Read AMT and obtain location of the u.r.
Step 4: Retrieve the u.r. (over the FDDI network if necessary)
Step 5: Get location of user name from u.r. (note, there is no need to retrieve and play the greeting.)

Step 6: Play the name (over the FDDI network if necessary, that is, if the name is not on the system that received the call)
Step 7: Prompt for the user password
Step 8: Listen to the password
Step 9: Verify the password with the data in the u.r.
Step 10: Prompt for the desired function (review, record, etc.)
Assume a prompt for REVIEW is received:
Step 11: Get location of first message from u.r.
Step 12: Play message over the FDDI network if necessary, that is, if the message is not recorded on the system that received the call.
Step 13: Prompt for the desired function (delete, save, etc) Assume a prompt for DELETE is received:
Step 14: Decrement the message use count (note the same message may be directed to a large number of users and this will indicate that it has been sent to one of the addressees.
Step 15: update the u.r.
Step 16: write the user record back over the FDDI network if necessary.
Step 17: Prompt for the desired function (review, record, exit etc.)
Assume a prompt of EXIT; is received:
Step 18: Release the user record, that is notify the systems where the user record is stored that the operations on the user record are complete.
Step 18: Hang up Naturally it should be understood that the above pseudo code example is merely meant to be illustrative of the operations and the system can perform in the same manner the other types of operations that are normally performed by voice mail systems.

Figure 5:
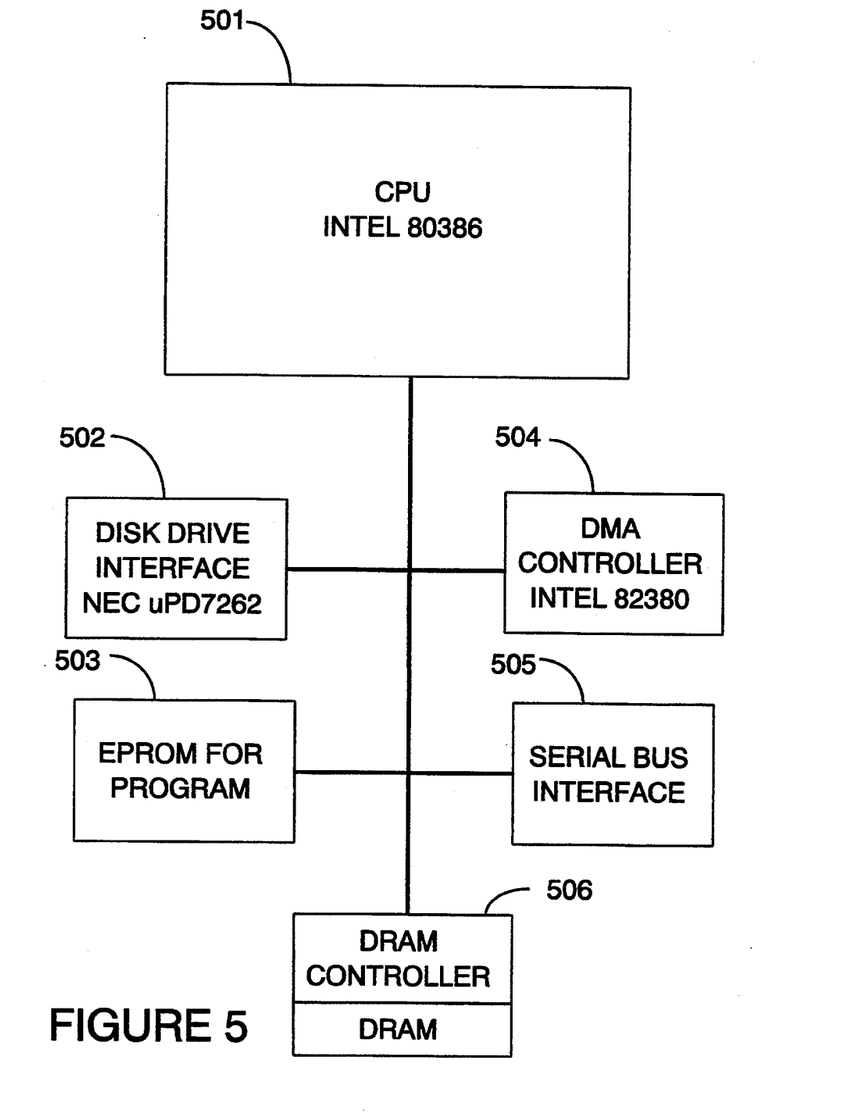
FIG. 5 is a block diagram of the file controller shown in FIG. 2.

The block diagrams of the units shown in FIG. 2 will now be described. FIG. 5 shows a block diagram of the system file card 28 shown in FIG. 2. While FIG. 5 shows the system file card 28, it should be noted that the system file card 28 is identical to the file message card 30.

The central component of the system file card is an Intel 80C386 microprocessor 501. A number of devices are attached to the data bus of CPU 501. The devices attached to data bus include a disk drive interface 502, an EPROM 503 which stores the program for the CPU, a DMA controller 504, a serial bus interface 505 and a DRAM controller 506. Each of the units 501 to 506 can be standard components which are well known. For example the Disk drive interface 502 can be an NEC uPD7262 chip and the DMA controller 504 can be an Intel 82380 DMA controller. Serial bus interface 505 and Dram controller 506 are well known components.

Figure 6:
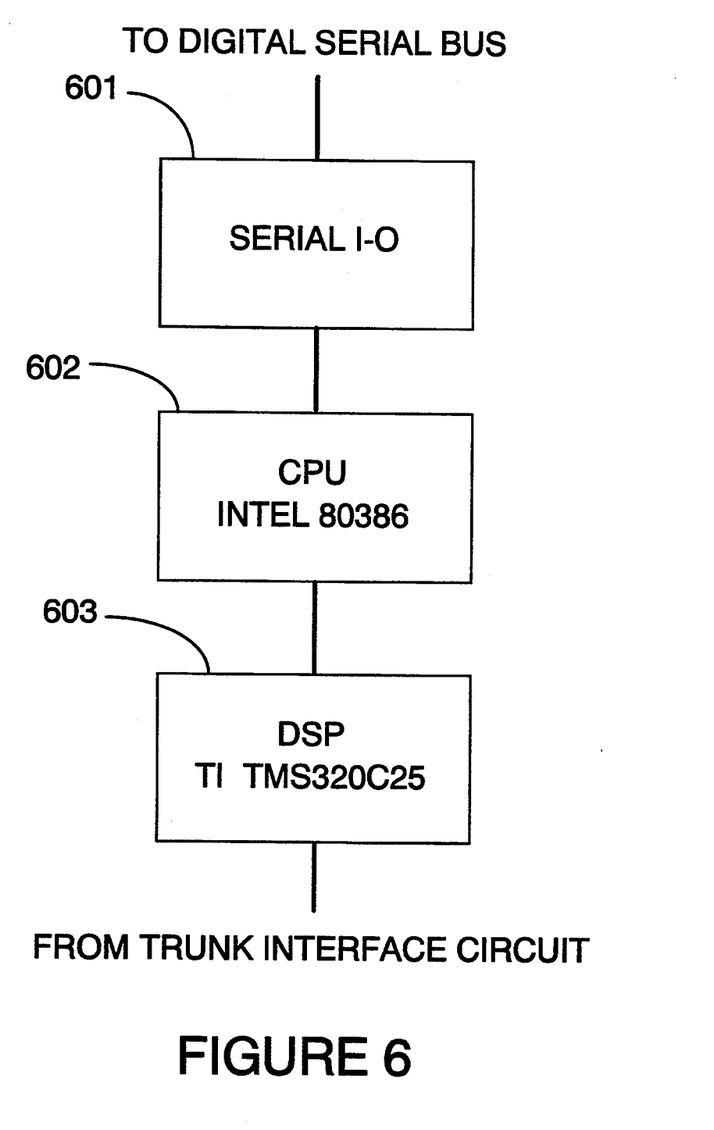
FIG. 6 is a block diagram of the Digital line card shown in FIG. 2.

FIG. 6 shows a block diagram of the Digital Line card 26. The line card 26 is controlled by its own 386 processor 602. The CPU 602 receives inputs for a DSP chip 603 which is connected to the analog trunk interface circuits. Chip 603 may for example be a IT TMS320C25 chip. The output of cpu 601 is provided on a serial bus 601 and thus made available to CPU 25 shown in FIG. 2.

Figure 7:
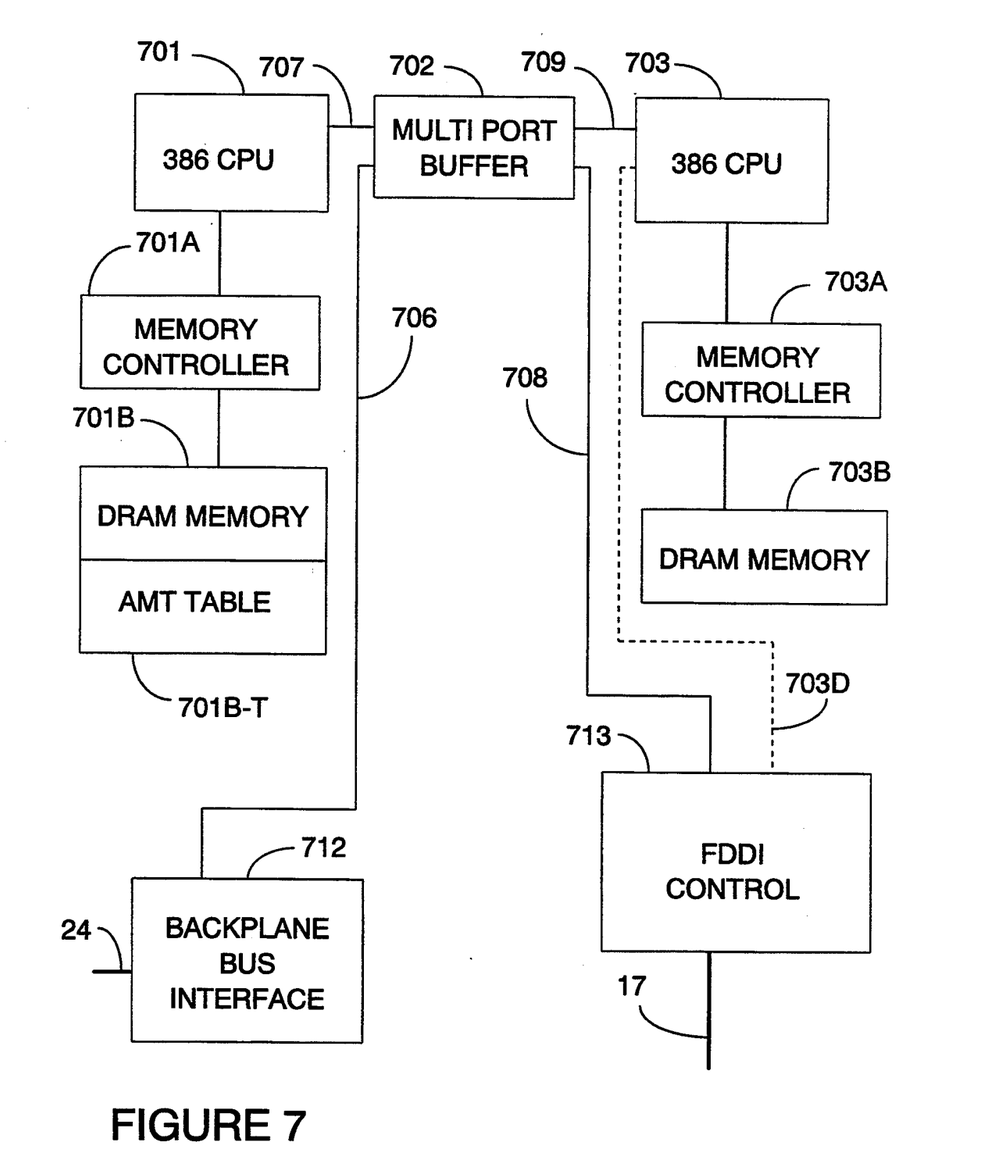
FIG. 7 is a block diagram of the Cluster Controller shown in FIGS. 1 and 2.

FIG. 7 is an overall block diagram of cluster controller 14A shown in FIG. 2. The cluster controller 14A includes two 386 CPUs 701 and 702. CPU 701 handles the searching of the AMT table and the updating of the user profiles. CPU 703 handles the control of the FDDI bus. Each of the CPU's 701 and 703 has an associated memory controller 701A and 703A respectively and associated DRAM memory 701B and 703B respectively.

The bus 24 is connected to a bus interface circuit 712 and the FDDI bus 17 is connected to a FDDI control circuit 713. The four major components in the cluster controller, namely, the two CPU's 701 and 703, the backplane bus circuit 712 and the FDDI circuit 713 communicate through a four way multiport buffer 702. As shown by the dotted line 703D, CPU 703 controls the FDDI interface 713.

Figure 8:
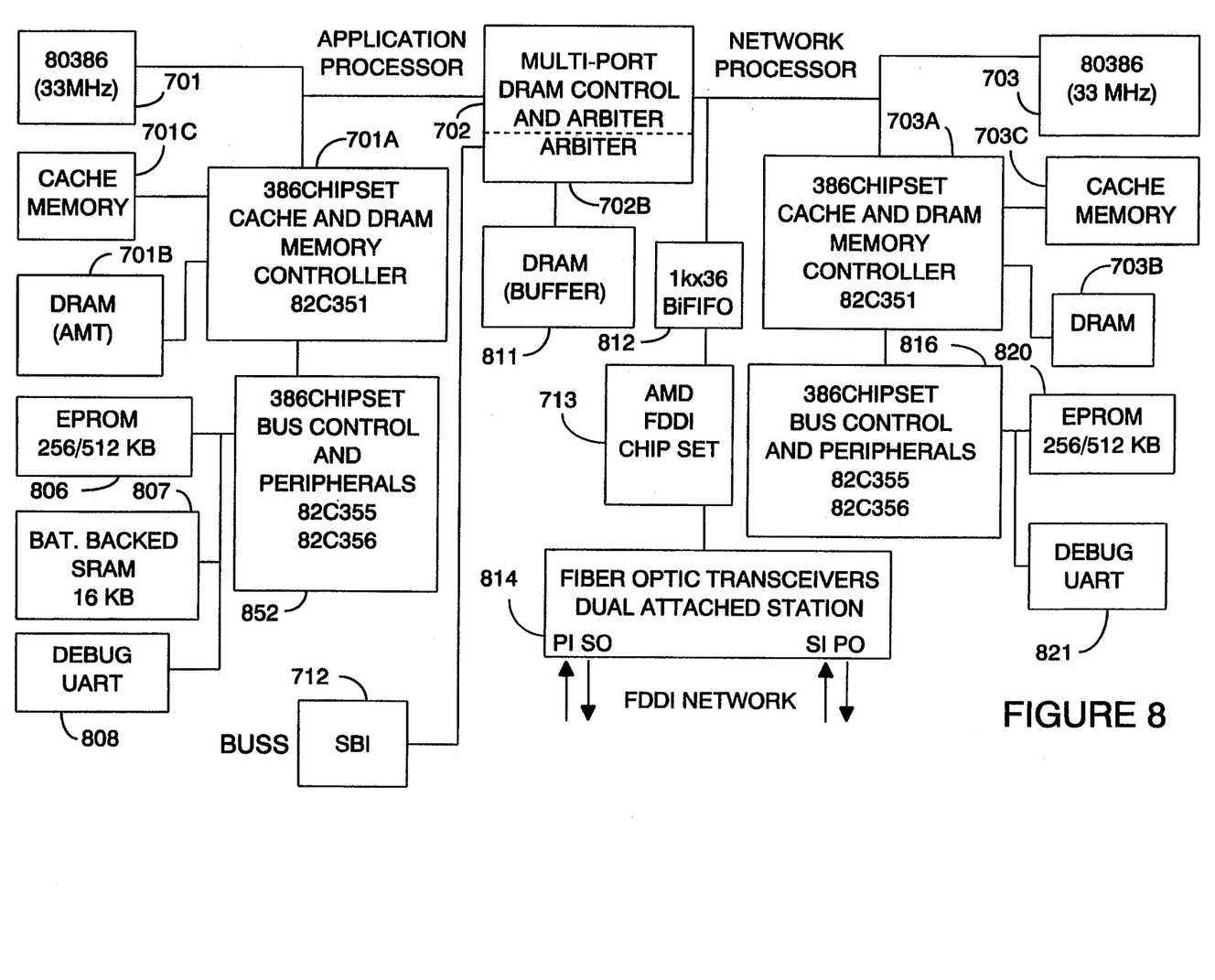
FIG. 8 is a detailed block diagram of the cluster controller shown in FIGS. 1, 2 and 9.

A more detailed diagram of the cluster controller 14A is shown in FIG. 8. FIG. 8 shows the commercially available chips that can be used to implement the cluster controller. For example memory controllers 701A and 703A may be implemented using 82C351 memory controllers that are commercially available from Chips and Technologies Corporation.

FIG. 8 also shows that each of the processors 701 and 703 can have associated bus and peripheral controllers 805 and 816 respectively. The bus and peripheral controllers may be 82C356 and 82C356 chips commercially available from Chips and Technologies Corporation. The bus and peripheral controllers 805 may in turn be connected to EPROM 806 and 820, to universal asynchronous terminals 808 and 821 and to a battery backed SRAM 807.

The interface to the FDDI bus can be via commercially available FDDI interface chips that are commercially available from Advanced Micro Devices Corporation under the Trademark Supernet. The output of the AMD FDDI chips is connected to commercially available Fiber Optic Transceivers which are in turn connected to the FDDI network.

Each of the memory controllers 701A and 703A has an associated cache memory 701C and 703C and associated DRAM memory 701B and 703B. These are conventional commercially available components. Likewise multiport dram control and arbiter 702 has an associated DRAM buffer 811. Dram Control 702 also includes an arbiter or priority circuit 702B which decides which line will have access to DRAM 811 if two lines seek access at the same time. This is conventional circuitry.

Figure 10:
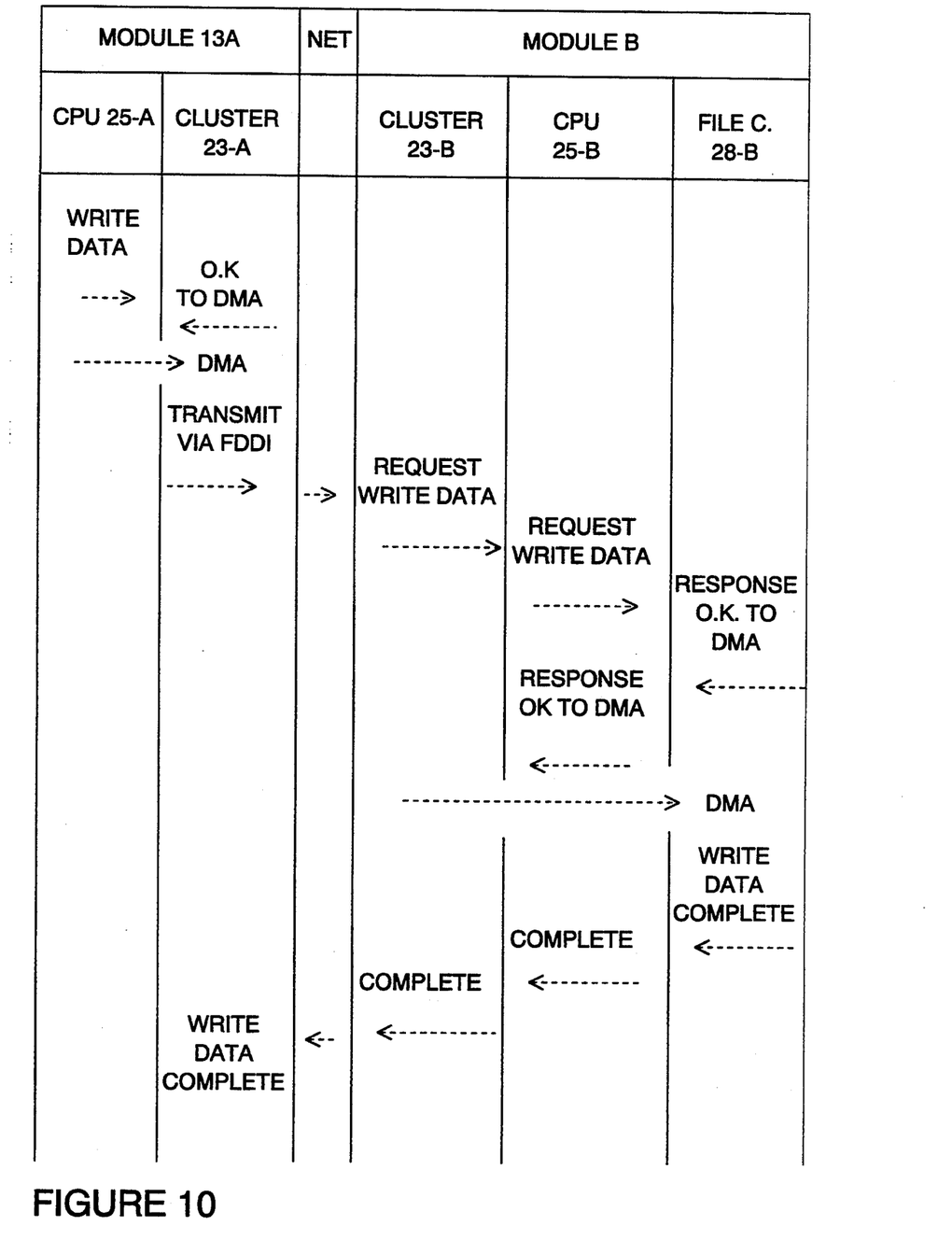
FIG. 10 is a timing and flow diagram that shows how messages are transmitted over the FDDI network.

FIG. 10 is a timing diagram showing the operation of the cluster controller when information is being transferred between station A and station B. Assume station A CPU 25 sends a write request to the cluster controller 23. The cluster controller card 23 responds and a DMA transfer begins serial bus interface 712 to DRAM 811. After the DMA transfer is complete, CPU 703 sends the data over the FDDI bus. The command goes through the cluster controller 23 in station B to the file card in station B which responds that it is ready to receive a DMA Transfer. The DMA transfer then begins. Once the transfer has been successfully completed, a message saying the operation is complete is sent from the file card to the cluster controller. The cluster controller card sends this message over the FDDI network to Station A and the operation is complete.

Figure 9A:
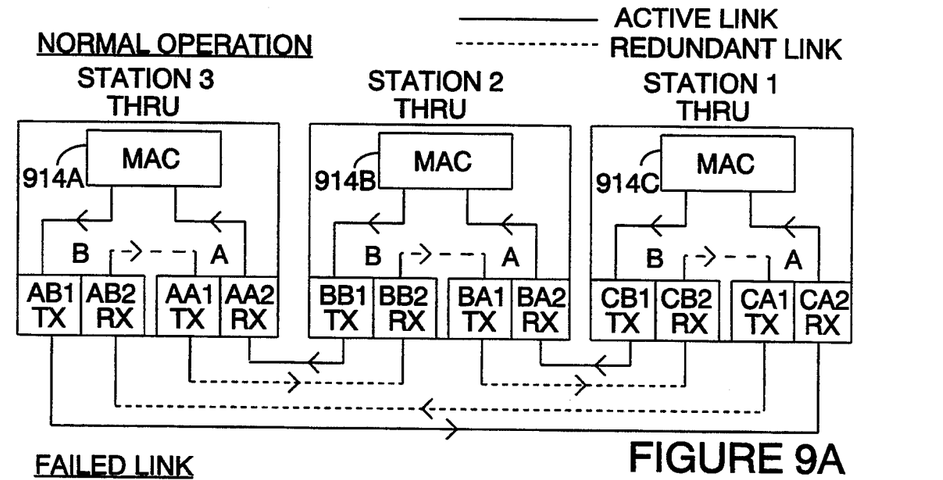
FIGS. 9A–9C are wiring diagrams for the FDDI network shown in FIG. 1.
Figure 9B:
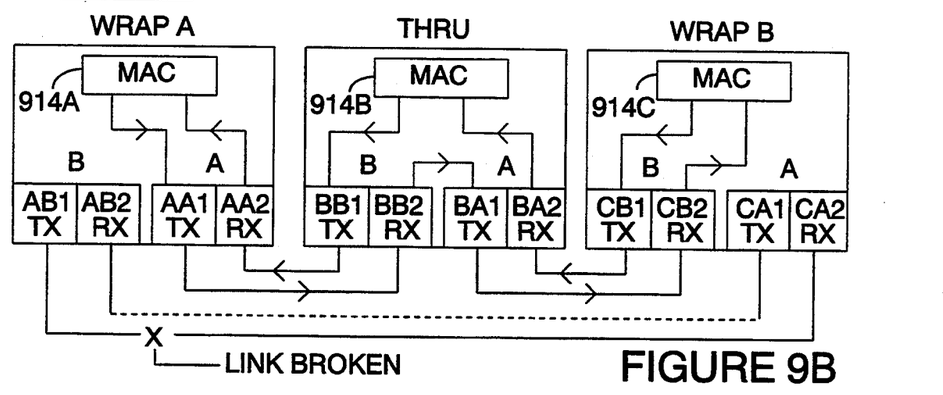
Figure 9C:
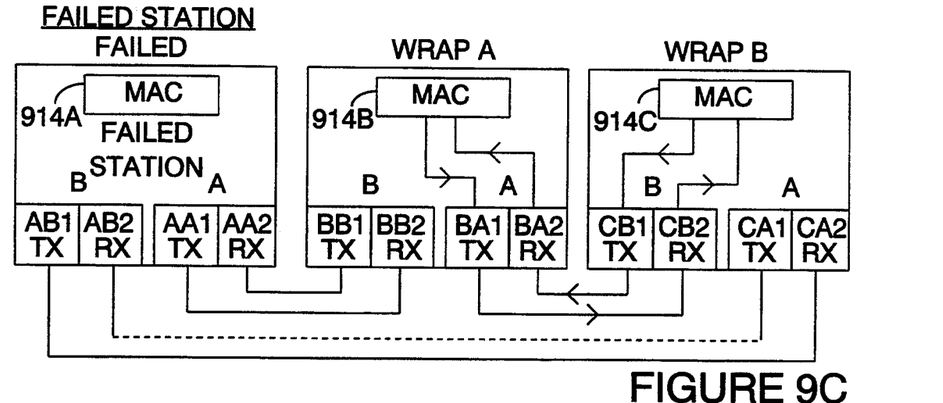

The FDDI network 17 is connected in dual counter rotating rings as shown in FIGS. 9A, 9B and 9C. FIG. 9A shows the media access control 914A, 914B and 914C for the three stations 13A, 13B and 13C. The media access control chip is part of the standard FDDI chips set 713 which is commercially available from Advanced Micro Devices. Each of the media access control devices 914 has two associated transmitters "tx" and two associated receivers "rx". The transmitters and receivers are designated AB1, AA1, AB2 AA2 as shown. The first set of receivers in each station is designated "B" and the second set is designated "A". The transmitters and receivers are connected to optical fibers in dual loops as shown.

FIG. 9A shows the normal operation. The solid lines show the fiber optic paths that are being used during normal operation. It is noted that there is no active transmission path from the "A" transmitter to the "B" receiver in each station. The path is from the "A" receiver to the media access control to the "B" transmitter.

FIG. 9B illustrates what happens when there is a break in one of the normal paths. It is noted that the chipset detects the break because there is no longer a closed path. In station 914A, the media access control switches to both the "A" transmitter and to the "A" receiver. In station 914B, a path is formed from the "B" receiver to the "A' transmitter, and in station 914C, the media access control switches to both the receiver and transmitter in the "B" group.

FIG. 9C illustrates what happens when a station fails. In the illustration it is assumed that station 914A has failed. Station 914 B switches to both the transmitter and the receiver in the "A" group and station 914C switches to both the transmitter and the receiver in the 37 B" group.

With the system as shown the cluster of systems has FDDI redundancy and automatic reconfiguration. The FDDI redundancy supplements the module redundancy previously described.

The present invention can also be used with systems that handle fax messages or other data. In general the invention is applicable to any information server where calls are received by modular processing units which communicate over a bus network.

Figure 11:
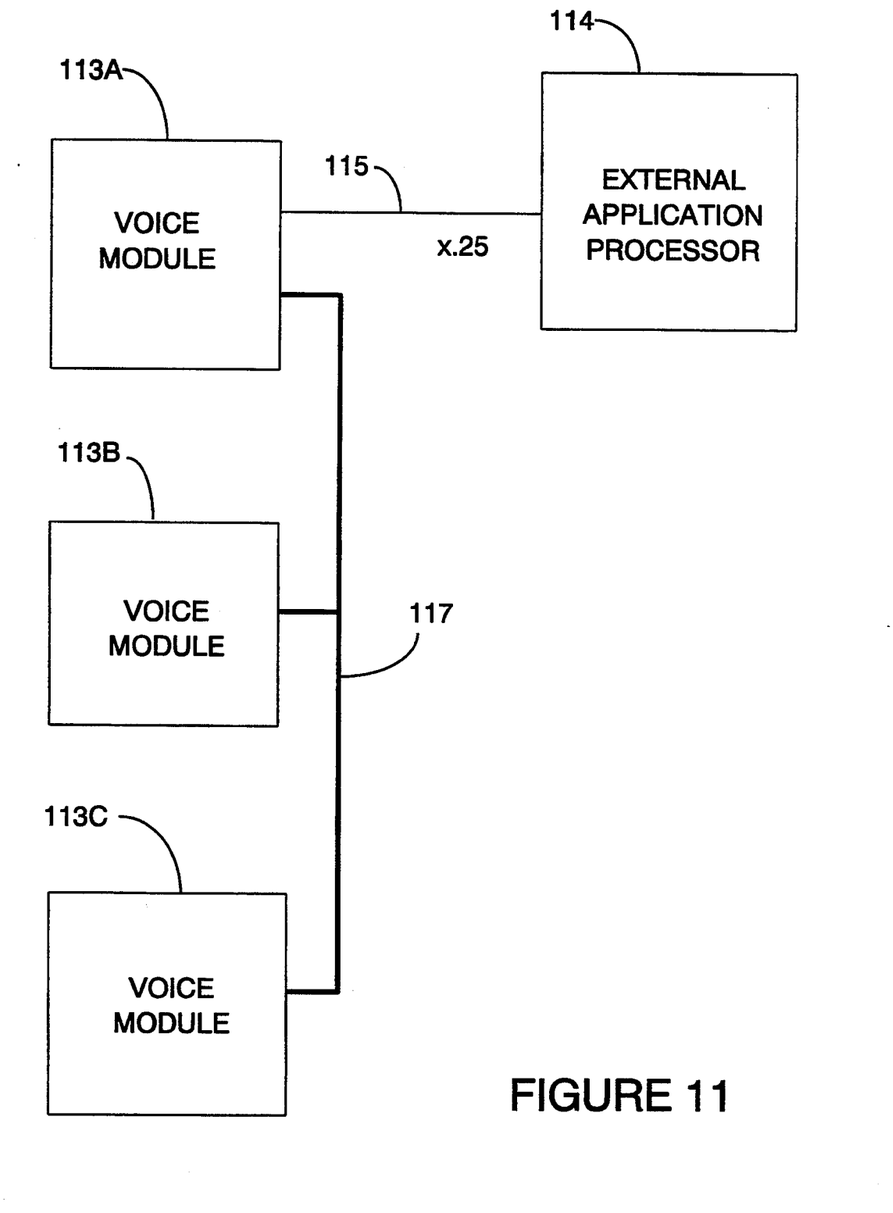
FIG. 11 is an alternate embodiment of the invention.

One possible alternative embodiment of the invention is shown in FIG. 11. The embodiment shown in FIG. 11 includes three voice processing units 113A, 113B and 113C which correspond to voice processing sub-systems 13A, 13B and 13C shown in FIG. 1. Units 113A, 113B and 113C are connected to an FDDI bus 117 similar to the manner that units 13A, 13B and 13C are connected to bus 17. The connection of modules 113A, 113B and 113C to a PBX or central switch is similar to the first embodiment and is not shown in FIG. 11.

The system shown in FIG. 11 also includes a external application computer 114. The external application computer 114 can also be referred to as an external application processor. It is connected to voice processing module 113A via a conventional X.25 line 115. Alternate types of data connections could be used. Such data paths between computers are well known in the art.

The external application processor 117 can handle a wide variety of data storage, retrieval and calculating tasks. For example processor 114 could be connected to a bank computer and it could be programmed to provide account balance information. The following is a pseudo code example of how such a system would be programmed to respond to a call which arrives at module 113B and which requests an account balance:

Step 1: Voice module 113B detects incoming call and goes off hook.

STEP 2: check AMT table to insure caller is authorized. (possibly also retrieves user profile as previously described and checks password)

STEP 3: Voice module 113B sends a message via the FDDI bus 117 to the voice module 113A which in turn sends the message to External Application Processor 114 (hereinafter EAP 114) indicating that a transaction has been started.

STEP 4: EAP 114 sends a message (via module 113B and via the FDDI bus) to module 113B telling it to play the phrase "Enter Account Number" and to collect the account digits. Note that the prompt is stored on each module hence it is available.

STEP 5: Prompt played and Account digits collected.

STEP 6: Module 113B sends the account number to the EAP 114.

STEP 7: EAP 114 determines the value of the account balance.

STEP 8: EAP 114 sends command to module 113B to play the phase "Your account balance is".

STEP 9: EAP 114 sends the command to module 113B to play the specific digits that comprise the account balance. (Note the voice for the digits is stored on each module).

STEP 10: module 113B plays the phrase and the amount.

STEP 11: module 113B goes off hook.

Step 12: module 113B sends a message to EAP indicating that the transaction is complete.

It should be understood that the above example was chosen for the purpose of Showing how an application from an external application processor fits into a system that is built according to the present invention. Many other types of external applications including a wide variety of applications involving handling data and fax messages is possible.

In the embodiments described above, the AMT table on each system contains an entry for each user in the entire cluster. In an alternative embodiment each module merely has a table listing the users primarily assigned to that module. With this alternative embodiment, when a call comes in to a particular module, the table in that module is first searched and if the user profile is not on the module that received the call, the tables in the other modules are searched via the FDDI bus. When the profile is located using this search method, the system would operate as previously described.

While not explicitly shown herein, particular mailboxes could be assigned a class of service where each greeting and each message is stored on two systems in the same way that profiles are shown herein stored on two systems.

The terms voice mail system and voice processing system are used herein to mean a system which can be connected to a telephone network to provide services such as recording voice messages and redirecting such messages. The term voice mailbox means a function which is generally available in commercial voice mail systems, whereby a user has a profile which includes a mailbox number. Messages left for the user are tagged with the users mailbox number. A mailbox number usually but not necessarily corresponds to a telephone extension number. The terms are used herein to mean what these terms have generally come to mean in the voice processing industry.

While the invention has been shown and described with respect to several particular embodiments thereof, it should be understood that the applicant's invention can be practiced in alternate and equivalent ways. The scope of applicants's invention is solely limed by the appended claims.

We claim:

1. A cluster of processing modules for providing mailboxes for a plurality of users, each user having an associated mailbox, each particular one of said modules including means for responding to an incoming call, and for storing messages, each of said users having an associated profile,     means for interconnecting said modules and for transferring profiles between modules,     each of said modules having stored therein an access management table with entries that indicates the module where the profile associated with each of said users is stored and,     cluster controller means in each of said modules responsive to a call to the associated module for a particular user for interrogating the access management table stored in said module to determine where the particular user's profile is stored and for retrieving said profile, updating said profile indicating the location messages for said particular user are stored and for returning said updated profile to the module listed in the access management table,     whereby any one of said modules can handle a call for any one of said users.

2. A system including a cluster of voice processing sub-systems for providing electronic mail boxes for a plurality of users, said system including in combination:

a plurality of input lines for receiving calls, said lines going to said voice processing sub-systems, each input line going to one of said voice processing sub-systems,     means in each of said voice processing sub-systems for storing a plurality of user profiles, said profiles storing information about said user mail boxes     each of said voice processing sub-systems having means for storing a table which lists said users and which lists where the profile for each user is stored,     network means interconnecting said voice processing sub-systems, whereby user profiles can be transferred between said voice processing sub-systems,     means responsive to an incoming call, to obtain the associated user's profile from the system where such profile is resident,     means for storing incoming messages on the voice processing sub-system which received a call, and     means for updating a user profile to show where messages are stored,     whereby any voice processing sub-system can handle a call for any user on the cluster of voice processing sub-systems.

3. An information server system comprising in combination, a plurality of information server modules for providing electronic mailbox facilities for a plurality of users,     a plurality of input lines, said input lines being distributed among said information server modules,     a profile for each of said users, said profiles being distributed among said modules,     a bus means connecting said information server modules into a cluster and,     profile obtaining means in each of said modules operable in response to an incoming call directed to a particular user, for obtaining the profile of said particular user irrespective of where said profile is stored,     whereby any of said information server modules can handle a call directed to any user.

4. The system recited in claim 1 wherein said means for interconnecting said modules and for transferring profiles between modules comprises a Fiber Distributed Data Interface (FDDI) network.

5. The system recited in claim 2 wherein said network means is a Fiber Distributed Data Interface (FDDI) network.

6. The system recited in claim 3 wherein said bus means is a Fiber Distributed Data Interface (FDDI) network.

7. The system recited in claim 1 including means for storing each user profile in two of said modules, whereby said system can continue operating if one module is inoperative.

8. The system recited in claim 2 including means for storing each user profile in two of said voice processing sub-systems, whereby said system can continue operating if one voice processing sub-system is inoperative.

9. The system recited in claim 3 including means for storing each user profile in two of said modules, whereby said system can continue operating if one of said modules is inoperative.

* * * * *